United States Patent Office

3,814,605
Patented June 4, 1974

3,814,605
PHOTOGRAPHIC ELEMENTS AND THEIR PREPARATION
Daniel J. Gallois, Mericourt, and Bernard Pouillot, Champigny-sur-Marne, France, assignors to Eastman Kodak Company, Rochester, N.Y.
No Drawing. Filed Dec. 16, 1971, Ser. No. 208,895
Claims priority, application France, Jan. 15, 1971, 7101234
Int. Cl. G03c 1/84, 5/06, 5/32, 5/50, 7/00
U.S. Cl. 96—58   10 Claims

ABSTRACT OF THE DISCLOSURE

Elements including an image that is opaque to ultraviolet and blue light and is substantially transparent to wavelengths of light over about 500 nm. include a chemical complex of silver with a heterocyclammonium salt, this complex having the aforementioned optical absorption characteristics. Such elements can be used as photographic mask elements. The complexes can be prepared by reacting a water-insoluble silver salt, preferably when in an image-wise distribution, with an aqueous solution of the heterocyclammonium salt. The complex then forms in regions corresponding to the silver salt distribution. Silver salts that are useful can be prepared in situ by oxidation of a photographic silver image. In one aspect, when a photographic silver image is reacted with a heterocyclammonum salt that is substituted with at least one nitro group and/or is a nitrate salt, the desired complex can be formed without requiring a separate step to oxidize the silver image to the appropriate water-insoluble silver salt.

BACKGROUND OF THE INVENTION

Field of the invention

The present invention relates to elements useful in photography and to processes for forming such masks. More particularly, the present invention relates to photographic masks that are opaque to ultraviolet and blue light but substantially transparent to wavelengths of light over about 500 nm.

Description of the prior art

In the photofabrication of electrical devices such as printed circuits and microcircuitry and in photomechanical reproduction, it is often necessary to register simultaneously several super-imposed photographic transparencies. Visual registration is usually extremely difficult or impossible when the transparencies contain silver images because of the high degree of visible light opacity resulting from superposing transparencies which carry the complementary images. Images used as photographic masks in photo-fabrication or microphotography must be opaque to activating electromagnetic rays for the photoresist compositions which are used to obtain an imagewise pattern of material that is resistant to etch solutions such as ferric chloride and the like. Normally, exposing rays for photoresist compositions are rich in ultraviolet light.

A partial solution to the problems caused by highly opaque silver images is to transform the silver image into a corresponding dye image or the like. Numerous processes exist for transforming or toning images from silver to colored images. For example, one can sulfurize the silver image in order to obtain an image having sepia or warm brown coloration; one can also treat the silver image with gold thiocyanate so as to obtain a corresponding image of bluish color; one can also treat the silver image with sodium selenosulfate to obtain a corresponding image of sepia-brown color. Silver images can also be transformed into colored metallic ferrocyanide images by first treating the silver image with a potassium ferricyanide solution, and thereafter treating the same image with a suitable metallic salt solution, so as to form, e.g., copper ferrocyanide, iron ferrocyanide or uranium ferrocyanide images, as described in "La Technique Photographique" by L. P. Clerc, 6th Edition, pages 546 to 559. French Pat. 864,463 describes a process for the transformation of a silver image into a colored image of a silver salt and an organic compound containing an —SH or —NH grouping. All of these known processes produce colored images, usually images that are strongly colored, i.e., which absorb a considerable amount of the light in the visible portion of the spectrum.

There are processes that make it possible to obtain images which are opaque to ultraviolet and practically transparent to visible light, although slightly colored. Processes of this type obtain the transformation of a silver image into a corresponding colored image by means of certain chemical reactants or by direct formation of a colored image though photographic color development techniques. These prior art processes have several disadvantages including high cost and difficulty of operation.

It would thus be of advantage to provide a process which does not have these disadvantages and which allows the convenient formation of photographic masks that strongly absorb ultraviolet radiation and blue light of the visible spectrum, i.e., masks that are highly opaque to ultraviolet radiation, but are substantially transparent to visible light other than blue light. Such a process and masks prepared thereby would be particularly useful in the photofabrication of electrical devices, e.g. circuit preparation, and in photomechanical reproduction. With such a process, registration of masks by superposition under visible light would be facilitated.

Accordingly, it is an object of the present invention to provide new photographic mask elements.

It is another object of this invention to provide novel photographic mask elements wherein the mask is opaque to ultraviolet and blue radiation and substantially transparent to minus blue rays, i.e. visible light over about 500 nm.

Still another object of this invention is to provide novel processes for preparing photographic masks.

Yet an additional object of this invention is to provide new processes for preparing photographic masks from photographic silver and water-insoluble silver salt images.

Still another object of this invention is to provide novel photographic masks wherein the masking material is a complex of silver with a heterocyclammonium salt.

Other objects will become apparent from a consideration of the following specification and claims.

STATEMENT OF THE INVENTION

The objects of this invention are accomplished with processes for forming images that are opague to ultraviolet and blue light and are substantially transparent to wavelengths of light over about 500 nm. The images include a chemical complex that exhibits the noted optical absorbance characteristics, such complexes herein being chemical complexes of silver with a heterocyclammonium salt. Such processes are accomplished by reacting a water-insoluble silver salt, preferably when arranged in an imagewise distribution or pattern, with an aqueous solution of an appropriate heterocyclammonium salt to form the resultant complex. If the heterocyclammonium salt is a nitrate salt and/or bears one or more nitro groups substituted thereon, then the aqueous solution of the heterocyclammonium salt can be used to treat a photographic silver image to form the masking complex directly.

The masking complexes produced by processes described herein are useful in providing photographic mask elements including a layer which itself contains an imagewise distribution or pattern of masking complex. Masking layers are often often carried on a support, preferably one that is substantially transparent to electromagnetic rays that are not absorbed by the masking complexes described herein.

DESCRIPTION OF PREFERRED EMBODIMENT(S)

The image forming processes of this invention include reacting a water-insoluble silver salt with an aqueous solution of a heterocyclammonium salt to produce, as a reaction product, a chemical complex of silver with the heterocyclammonium salt that is opaque to ultraviolet and blue light and is substantially transparent to wavelengths of light over about 500 nm. Such complexes are effective masking complexes (masking materials) in the photo-fabrication of electrical circuits and in the imaging of photo-resists and other photographic materials that are predominantly responsive to ultraviolet and blue light.

As used herein, the term water-insoluble silver salt refers to silver salts that have a solubility in water at 20° C. less than about $9 \times 10^{-4}$ grams per 100 ml. The water insoluble silver halides, silver chloride, silver bromide and silver iodide, as well as mixtures thereof, are exemplary water-insoluble silver salts. The term opaque, as employed herein with reference to masking complexes, masking elements, etc., refers to substances having a high degree of opacity to or low transmission of specified wavelengths of light such as ultraviolet and blue rays. The specific degree of opacity can vary extensively, but in any particular instance, it should be sufficient to prevent photographic exposure in masked regions. The heterocyclammonium salts useful in the processes of the invention are well-known and have been used heretofore as intermediates in the preparation of spectral sensitizing dyes, especially cyanine type dyes. They include compound of the following general formula:

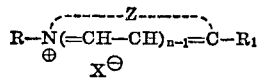

In the formula, R can represent a hydrogen atom, an alkyl group, advantageously a lower alkyl group having 1 to 4 carbon atoms such as methyl, ethyl, propyl, butyl, etc., a sulfoalkyl group, the alkyl moiety of which has 1 to 4 carbon atoms, such as sulfomethyl, sulfoethyl, sulfopropyl, etc. or a carboxyalkyl group, the alkyl moiety of which has 1 to 4 carbon atoms, such as carboxymethyl, carboxyethyl, carboxypropyl, carboxybutyl, etc.; an aryl group such as phenyl, an aryl group substituted by an alkyl group, a halogen atom, an alkoxy, thioalkyl, or nitro group, etc., $R_1$ can represent hydrogen, an alkyl group and preferably a lower alkyl group that itself can be substituted with an alkoxy, thioalkyl, carboxyl, alkali metal carboxylate, sulfo, or nitro group, attached to a carbon atom of the heterocycle, $X^{\ominus}$ can represent an anion such as a halide anion, e.g., chloride, bromide, iodide anion, perchlorate, methylsulfate, nitrate anion, etc., or an anion of an organic acid such as acetate, propionate, etc. anion and $n$ is 1 or 2.

Z can represent the non-metallic atoms necessary to complete a 5 to 6 membered heterocyclic nucleus containing 1 or 2 heteroatoms, the second of which, i.e. in addition to the nitrogen atom as in the above formula, is a sulfur, nitrogen or oxygen atom. The heterocycle can contain an aromatic nucleus fuse with (condensed on) the heterocyclic nucleus. Carbon atoms included within those atoms represented by Z can also be substituted with groups like those identified elsewhere herein, e.g. alkyl groups, nitro groups, etc.

Thus, the heterocyclic nucleus completed by the atoms represented by Z can be a benzothiazole nucleus, e.g., benzothiazole, 5-chlorobenzothiazole, 4-methylbenzothiazole, 5-bromobenzothiazole, 6-phenylbenzothiazole, 4-methoxybenzothiazole, 5 - iodobenzothiazole, 4 - ethoxybenzothiazole, 5 - hydroxybenzothiazole, etc.; a naphthothiazole nucleus, e.g., alphanaphthothiazole, beta-naphthothiazole, 5-methoxy-betanaphthothiazole, 5-ethyl-beta-naphthothiazole, 8 - methoxy - alpha - naphthothiazole, 7-methoxy-alpha-naphthothiazole, etc.; a benzoxazole nucleus, e.g., benzoxazole, 5-chlorobenzoxazole, 5-methoxybenzoxazole, 5-ethoxybenzoxazole, 5-hydroxybenzoxazole, etc.; a naphthoxazole nucleus, e.g., alpha - naphthoxazole, beta-naphthoxazole, etc., a benzoselenazole nucleus, e.g. benzoselanazole, 5-chlorobenzoselenazole, 5-methylbenzoselenazole, 5-hydroxybenzoselanazole, etc.; a napthoselenazole nucleus, e.g., alpha-napthoselanazole, beta-naphthoselenazole, etc.; a 2-quinoline nucleus, e.g., 2-quinoline, 3-methyl-2-quinoline, 6-chloro-2-quinoline, 8-chloro-2-quinoline, 6-methoxy-2-quinoline, 6-hydroxy-2-quinoline, 8-hydroxy-2-quinoline, etc.; a 4-quinoline nucleus, e.g., 4-quinoline, 6-methoxy-4-quinoline, 7-methoxy-4-quinoline, 8-methoxy-4-quinoline, etc.; an isoquinoline nucleus, e.g., 1-isoquinoline, 3-isoquinoline, etc.; a pyridine nucleus, e.g., 2-pyridine, 2-methyl-4-pyridine, 3-methyl-4-pyridine, 4-methyl-2-pyridine, etc. Other heterocyclic nuclei that can be completed by Z atoms are described in the literature pertaining to spectral sensitizing dyes, for example in U.S. Pat. 3,505,319, especially at columns 2 and 3.

Exemplary heterocyclammonium salts include such compounds

N-(2,4-dinitrophenyl)pyridinium chloride
N-(2,4-dinitrophenyl)quinolinium bromide
5-nitroquinolinium nitrate
5,7-dinitro quinolinium nitrate
N-methylquinolium iodide
N-methylquinaldinium methylsulfate
N-ethyl-6,8-dinitroquinolinium bromide
1-methyl-8-nitroquinolinium methylsulfate
8-nitroquinolinium nitrate
6,8-dinitroquinolinium nitrate
N-ethyl-5-nitrobenzothiazolium chloride
N-methyl-2-carboxypropylbenzoazolium bromide
N-ethyl-2-methylbenzimidazolium nitrate
5-chloro-6-nitrobenzothiazolium nitrate The utility of any particular heterocyclammonium salt can be determined conveniently by a simple screening procedure. One such procedure is to treat a silver halide (e.g. silver bromide) photographic element with an aqueous solution of the heterocyclammonium salt compound of concern to promote a reaction between the two and from a silver-heterocyclammonium salt complex of the type described herein. The aqueous solution used to dissolve the heterocyclammonium salt can contain water miscible organic solvents such as alkahols like alkanols, ketones such as acetone, etc. After the element is suitably treated and dried, the complex can be screened for spectral absorption using a spectrophotometer or the like device. Alternatively, one can use the element bearing the complex under evaluation as a photographic mask element in the exposure of a photoresist or other photographic material that is predominately sensitive in the ultraviolet regions of the spectrum. In such a case, it is most desirable if the water-insoluble silver salt, e.g. photographic silver halide, is distributed in an imagewise fashion. However, an overall distribution is useful for such evaluation.

According to one embodiment of the invention, wherein the process is used to form a imagewise photographic mask that is opaque to ultraviolet and blue light and is substantially transparent to wavelengths of light over about 500 nm., the process includes reacting an imagewise distribution of a water-insoluble silver salt with an aqueous solution comprising a heterocyclammonium salt of the present type to form a silver-heterocyclammonium salt complex (masking complex) which is opaque to ultraviolet and blue light and is substantially transparent to light over about 500 nm. The complex is formed in regions corresponding to the imagewise distribution of water-insoluble silver salt. The reaction occurs without difficulty at ambient temperatures, e.g. about 20° C. A water rinse and drying generally are used after the reaction treatment.

In one aspect of the instant processes, hereinafter termed the negative-positive process, a photographic silver image is converted into a coresponding pattern of water-insoluble silver salt. This can be accomplished by oxidizing the silver image. Such oxidation can be carried out by an oxidizing bath, also called a silver bleaching bath, like aqueous potassium ferricyanide and potassium bromide. In this instance, the silver image is converted to a corresponding silver bromide image. Then one can react the silver bromide image with an aqueous solution of a heterocyclammonium salt of the types described herein to form a corresponding image that is the chemical complex of the silver salt with the heterocyclammonium salt. This embodiment makes it possible, in particular, to prepare negative masks according to a positive original, which then serve for the printing of positive images, e.g., photofabrication of printed circuits or microcircuitry or in photomechanical reproduction.

According to another embodiment of the invention, called hereinafter the positive-positive process, one can imagewise expose a silver halide photosensitive material and then develop it to form a silver image which is negative with respect to the original. After development, a silver image is in exposed regions and remaining unexposed silver halides are in a positive image form with respect to the original, i.e. in unexposed regions. One transforms this silver halide positive image into a corresponding image that is a chemical complex of silver with the heterocyclammonium salt by treating the silver halide image with a heterocyclammonium salt solution. The complex image is positive with respect to the original. One then removes the negative silver image by treating it with a silver bleaching bath, such as those described elsewhere herein then with a fixing bath or with a single treatment bath comprising a bleaching agent and a fixing agent, the latter commonly being called a "bleach-fix" bath. Conventional fixing agents or silver halide solubilizing agents include water-soluble thiosulfates, thiocyanates and mercaptans such as ammonium thiosulfate, sodium thiocyanate and the disodium salt of 2-mercapto-4-hydroxy-5-amino-pyrimidine. A particularly preferred fixing agent is sodium thiosulfate. Fixing is generally accomplished by treatment with a fixing bath that incorporates a fixing agent such as those mentioned previously. An exemplary fixing bath is one having the formula:

| | |
|---|---|
| Sodium thiosulfate | g— 240 |
| Sodium sulfite (desiccated) | g— 15 |
| Acetic acid (28% aqueous) | cc— 48 |
| Boric acid (crystals) | g— 7.5 |
| Potassium alum | g— 15 |
| Water to make 1000 cc. | |

Heterocyclammonium salts of the present types that contain one or more nitro groups are particularly useful because they make possible the direct transformation, in a single step, of a silver image into a corresponding image that includes the chemical complex of silver with a heterocyclammonium salt of the present types. The nitro groups appear to assure the transformation of the silver image into the corresponding complex by means of oxidation. The nitro group or groups of such heterocyclammonium salts can be chemically bonded to one or more carbons of the heterocycle (or of an aromatic nucleus that is fused to the heterocyclic nucleus) or on the organic radicals used as substituents in lieu of the hydrogen atoms of the heterocycle. Such substituent groups, like a phenyl group, can be substituted on the carbon atoms or on the heteroatoms of the heterocycle. In addition, heterocyclammonium salts of the present types that contain nitrate anions (an oxidizing group) can also transform, in a single stage, the silver images into corresponding images including a chemical complex of silver with the heterocyclammonium salt. Such heterocyclammonium salts can also contain both nitro groups and nitrate anions. Examples of heterocyclammonium salts containing one or more nitro groups and/or a nitrate anion, useful in their embodiment of the process according to the invention, are summarized herein.

In the described negative-positive embodiment of the invention, one can bleach the silver image by means of any usual photographic silver bleaching bath, e.g., an oxidizing bath containing potassium fericyanide and potassium bromide which transforms the silver image into a silver bromide image. The equation of the reaction is as follows:

One generally uses a solution, the potassium ferricyanide concentration of which is between 2% and 70%, by weight, preferably between 3% and 6% by weight and the potassium bromide concentration of which is between 1% and 7% by weight. A particularly useful bleaching bath contains the following components:

| | G. |
|---|---|
| $K_3Fe(CN)_6$ | 6 |
| KBr | 6 |
| $H_2O$ to make 100 ml. | |

One can also use other oxidizing agents such as potassium bichromate.

The bleaching reaction is a rapid reaction which is complete after a treatment period of from several seconds to 6 minutes, usually after 2 to 3 minutes at room temperature, when a conventional photographic bleaching bath is used such as described previously.

The bleaching step can be carried out by any conventional procedure whatsoever, but it is advantageous to use a dipping procedure wherein one dips the photographic element, carrying the silver image to be treated, into the bleaching bath.

The silver salt image thus formed is then transformed into an image consisting of a chemical complex of silver with a heterocyclammonium salt by treating the silver salt image, formed by silver bleaching, with an aqueous solution containing an amount of heterocyclammonium salt of generally from 1% to 10% by weight and preferably an amount of from 2% to 5% by weight. One can effect this reaction at greatly varied temperatures, but it is convenient to operate at room temperature, the reaction generally being complete within several minutes.

Spectrographic measurements show that the formed complex displays an optical density in the ultraviolet and the blue region of the spectrum at least equal to the density of the initial silver image and is practically transparent to other wavelengths of the visible spectrum, i.e. wavelengths over about 500 nm.

According to a variation of the negative-positive embodiment of the invention, one uses a single treatment bath in order to transform the silver image into an image consisting of a complex of heterocyclammonium salt and silver. This treatment bath contains a heterocyclammonium salt having a nitro group substituent and/or nitrate anion such as described previously. Its function is, on the one hand, to oxidize the silver image into a silver salt image by the nitro and/or nitrate groups which it contains and, on the other hand, to form a complex of silver with the heterocyclammonium salt, which complex has the desired optical properties, i.e., which absorbs ultraviolet and blue and transmits the other wavelengths of the visible spectrum. A single treatment bath of this type preferably contains an amount of heterocyclammonium salt having a nitro (and/or heterocyclammonium nitrate) group substituent of from 0.1% to 10% by weight, preferably of from 1% to 3% by weight. One generally uses such a treatment bath, preferably at room temperature, during a period from 1 minute to 25 minutes, preferably from 2 minutes to 10 minutes.

Spectrographic measurements show that the formed image, consisting of the complex salt, displays in the ultraviolet and in the blue area of the spectrum a density at least equal to the density of the initial silver image and said complex is practically transparent to other wavelengths of the visible spectrum.

In the second embodiment of the previously described process according to the invention, an original is used to expose a photographic element which is developed to yield a negative image. Then one converts the residual silver halides, which are in positive image from with respect to the original, into an image consisting of a complex of a heterocyclammonium salt and silver by the treatment previously described. In order to isolate the positive image consisting of a complex of silver with a heterocyclammonium salt it is necessary to remove the negative silver image. To accomplish this, one can treat the photographic element with any usual photographic silver bleaching solution, e.g., with an aqueous potassium ferricyanide solution as previously described for the bleaching of the silver image in the negative-positive embodiment of the invention. The bleached silver image is removed by means of an aqueous solution of a fixing agent, e.g. sodium thiosulfate, in the conventional manner. The resulting positive complex image presents the same characteristics of absorption as the negative image obtained in the negative-positive embodiment.

As mentioned previously, the process of the invention is particularly useful in preparing photographic masks which, because of their good transparency over a wide range of the visible spectrum (e.g., wavelengths from about 500 nm. to about 700 nm.), are easily registered or aligned visually when superimposed in a stack. These masks, which are opaque to blue and ultraviolet radiation, serve to control the exposure of a photosensitive resist composition which is sensitive to the blue and ultraviolet radiation of the spectrum. The resist material after processing can carry a plano or an etched resist image, depending on the type of processing selected.

In photofabrication of electrical devices the novel process of this invention makes it possible to transform micro-images, e.g., silver micro-images having an average size of from 1$\mu$ to 20$\mu$ which are obtained on a photographic plate having a high resolving power, into the corresponding images of complexes as described herein. The complex micro-images formed according to the invention do not vary in size with respect to the treated silver image. In the field of photomechanical reproduction, the process of the invention makes it possible to convert images of continuous tone, or screened images obtained on films with continuous tone, lithographic-films, or films with high resolving power, etc. to images which are composed of water-insoluble silver salts and chemical complexes of the present types.

The following examples are provided for a further understanding of the invention.

Examples 1 to 4 illustrate the negative-positive embodiment of the novel process.

Example 1

A high resolution spectroscopic plate is imagewise exposed to a series of micro-images. The plate is then developed in the following solution:

| | |
|---|---|
| Water _____cc__ | 750.0 |
| Sodium sulfite _____gr__ | 90.0 |
| Hydroquinone _____gr__ | 45.0 |
| Sodium hydroxide _____gr__ | 37.5 |
| Potassium bromide _____gr__ | 30.0 |
| Water to make 1.0 liter. | |

Development time is five minutes at 20° C., and a silver image having an optical density of approximately 2.0 is produced in exposed regions. The plate is then fixed in a sodium thiosulfate fixing bath and washed. The image is then silver bleached by dipping the plate into a solution which has the following composition:

| | G. |
|---|---|
| Potassium ferricyanide _____ | 6 |
| Potassium bromide _____ | 6 |
| Water sufficient quantity to obtain 100 ml. | |

Bleaching time is 2 minutes at 20° C. followed by a water rinse for 1 minute. Then the plate, carrying the bleached image, a silver bromide image, is dipped into a heterocyclammonium salt solution which has the following composition:

| | G. |
|---|---|
| N-methylquinolinium iodide _____ | 2 |
| Potassium iodide _____ | 4 |
| Water sufficient quantity to obtain 100 ml. | |

The time of the image conversion is about 4 minutes at 20° C. After rinsing with water, a masking element is obtained which carries a lemon-yellow mask image corresponding to the initial silver image and having an optical density over 3.0 to wavelengths below 400 nm. and a density equal to 2.0 to wavelengths to 460 nm. To wavelengths of light above about 500 nm., this image is substantially transparent. Accordingly, visual registration of such mask elements is convenient.

Example 2

Using the procedure of Example 1, one half of the areas of the silver images of a step tablet formed on spectroscopic film through a 0.30 (log E) color scale is transformed into a masking element of the present type. A support having thereon a photosensitive polymer composition of the type used in the preparation of polymer resists is exposed through the thus partially transformed step tablet using a 125 watt high pressure mercury vapor lamp, rich in ultraviolet rays. After exposure, the photosensitive polymer is insolubilized in the same steps of the resist image whether they are made through the transformed step tablet image or through the non-transformed step tablet image. This example shows that the image consisting of the complex salt, formed according to the invention, is as opaque to ultraviolet rays as a metallic silver image. However, the transformed regions of the step tablet transmit visible light freely.

Example 3

A mask element is prepared as in Example 1, but substituting the N-methylquinolinium iodide solution with the following solution:

| | G. |
|---|---|
| N-(2,4-dinitrophenyl)pyridinium chloride _____ | 1 |
| Potassium iodide _____ | 1 |
| Water sufficient quantity to obtain 100 ml. | |

The time of the treatment is 3 minutes at 20° C., and one obtains a yellow-orange complex image, the optical density of which is approximately equal to 3.0 at 400 nm. and equal to 2.0 at 430 nm.

Example 4

An element is prepared according to the procedure of Example 1, but substituting the N-methylquinolinium iodide solution with the following solution:

| | G. |
|---|---|
| N-methylquinaldinium methylsulfate _____ | 0.6 |
| Potassium iodide _____ | 0.4 |
| Water sufficient quantity to obtain 100 ml. | |

The time of treatment is 5 minutes at 20° C. The plate is then washed with running water. The complex making up the mask is of an intense magenta color. This magenta color is presumably due to the formation of an isocyanine dye.

Example 5

This example illustrates the positive-positive embodiment of the process according to the invention. A series of silver micro-images are developed according to the procedure of Example 1. At the end of the development, the plate is rinsed with water for 30 seconds, then the image of the residual silver halides, positive with respect to the original, is transformed into an image consisting of a complex of heterocyclammonium salt and silver by dipping the developed product, carrying the silver halide image, into the following solution:

| | G. |
|---|---|
| N-methylquinolinium iodide | 2 |
| Potassium iodide | 4 |
| Water sufficient quantity to obtain 100 ml. | |

The time of the treatment is 4 minutes at 20° C. The developed silver image, which is negative with respect to the original, is then rinsed with water and bleached with a silver bleaching bath as described in Example 1. The resultant bleached image is removed with a sodium thiosulfate fixing bath. In lieu of the bleaching bath and the fixing bath, one can use a conventional single bleaching fixing bath. As in Example 1, a yellow-colored image displaying the same characteristics of absorption is formed. However, in the present case, the mask image is positive with respect to the original. Examples 6, 7 and 8 illustrate variation of the negative-positive embodiment of the invention wherein one uses a single treatment bath in order to transform the silver image into an image consisting of a complex of silver with a heterocyclammonium salt.

Example 6

A silver image is developed and fixed as in Example 1. After rinsing, it is placed into the following treating solution:

| | |
|---|---|
| N-(2,4-dinitrophenyl)pyridinium chloride | g 1 |
| Potassium iodide | g 1 |
| Hydrochloric acid | ml 1 |
| Water sufficient quantity to obtain 100 ml. | |

The time of treatment is 3 minutes at 20° C. One obtains a yellow-orange complex image displaying the same characteristics of absorption as the image of Example 3.

Example 7

A silver image is formed on a photographic product of the lithographic type. This exposed film is developed in a lithographic developer, fixed and rinsed in the usual manner for this type of film, then dipped into a nitro-substituted heterocyclammonium salt solution containing the following components:

| | |
|---|---|
| 2,4-dinitrophenylpyridinium chloride | g 1 |
| Potassium iodide | g 1 |
| Hydrochloric acid | ml 1 |
| Water sufficient quantity to obtain 100 ml. | |

The time of the treatment is 3 minutes at 20° C. A complex of a dark orange color is formed in regions corresponding to the silver image.

Example 8

A silver halide photographic element capable of reproducing continuous tones is exposed to a 0.15 (log E) color scale, then developed to obtain a silver image having a maximum density of 3.0 with a gamma of 1.20. The developed image is fixed and rinsed. The film is then placed into a heterocyclammonium nitrate solution having the following composition:

| | |
|---|---|
| 5-nitroquinolinium nitrate | g 0.5 |
| Potassium iodide | g 2.0 |
| 3/100 of a hydrochloric acid solution | ml 10.0 |
| Water sufficient quantity to obtain 100.0 ml. | |

The time of the treatment is 5 minutes at 20° C. An image which has a density in the ultraviolet and the blue up to 400 nm. of at least equal to the density of the initial silver image is obtained. This masking image transmits visible light and can be visually registered easily. Images of complex salts displaying the same characteristics of absorption are obtained when the continuous tone photographic element is replaced with a photographic element that displays a high resolving power such as high resolution films or plates or with lithographic-type films. In this latter case, the period of treatment can reach 20 minutes at 20° C. if the silver image has a density of 4.

The invention has been described in detail with particular reference to certain preferred embodiments thereof, but it will be understood that variations and modifications can be effected within the spirit and scope of the invention.

There is claimed:

1. A process for forming an image that is opaque to ultraviolet and blue light and is substantially transparent to wavelengths of visible light over about 500 nm., said image comprising a chemical complex of silver with a heterocyclammonium salt having the formula:

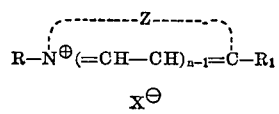

wherein R represents a hydrogen atom, a sulfoalkyl group, a carboxyalkyl group, an alkyl group, an aryl group or an aryl group substituted with an alkyl group, a halogen atom, an alkoxy, thioalkyl, or nitro group, $R_1$ represents a hydrogen atom, an alkyl group, or an alkyl group substituted with an alkoxy, thioalkyl, carboxyl, alkali metal carboxylate, sulfo, or nitro group, Z represents the non-metallic atoms necessary to complete a 5 to 6 membered heterocyclic nucleus containing one or 2 heteroatoms of which the second heteroatom is sulfur, nitrogen or oxygen, $X^\ominus$ represents an anion and $n$ is 1 or 2, the process comprising reacting an imagewise distribution of water-insoluble silver halide with an aqueous solution comprising said heterocyclammonium salt to form said complex in regions corresponding to said imagewise distributed silver halide.

2. A process as described in claim 1 wherein the water-insoluble silver salt is formed by oxidizing a photographic silver image.

3. A process as described in claim 2 wherein the oxidation is accomplished by treating said photographic silver image with a solution comprising potassium ferricyanide and potassium bromide.

4. A process as described in claim 2 wherein the steps of forming the water-insoluble silver salt and reacting it to form the complex are accomplished by treating the photographic silver image with an aqueous solution of a heterocyclammonium salt that is substituted with at least one nitro group and/or is a nitrate salt.

5. A process for forming an image that is opaque to ultraviolet and blue light and is substantially transparent to wavelengths of visible light over about 500 nm., said image comprising a chemical complex of silver with a heterocyclammonium salt that is either N-(2,4-dinitrophenyl)pyridinium chloride, N-(2,4-dinitrophenyl)quinolinium bromide, 5-nitroquinolinium nitrate, 5,7-dinitroquinolinium nitrate, N-methylquinolinium iodide, or N-methylquinaldinium methylsulfate, the process comprising reacting an imagewise distribution of a water-insoluble silver halide with an aqueous solution comprising said heterocyclammonium salt to form said complex in regions corresponding to said imagewise distributed silver salt.

6. A process as described in claim 5 wherein said water-insoluble silver salt is either silver chloride, silver bromide, silver iodide or mixtures thereof.

7. A photographic process for forming an image that is opaque to ultraviolet and blue light and is substantially transparent to wavelengths of visible light over about 500 nm., said image comprising a chemical complex of silver with a heterocyclammonium salt, having the formula:

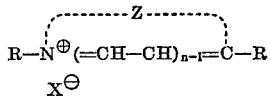

wherein R represents a hydrogen atom, a sulfoalkyl group, a carboxyalkyl group, an alkyl group, an aryl group or an aryl group substituted with an alkyl group, a halogen atom, an alkoxy, thioalkyl, or nitro group, $R_1$ represents a hydrogen atom, an alkyl group, or an alkyl group substituted with an alkoxy, thioalkyl, carboxyl, alkali metal carboxylate, sulfo, or nitro group, Z represents the nonmetallic atoms necessary to complete a 5 to 6 membered heterocyclic nucleus containing one or 2 heteroatoms of which the second heteroatom is sulfur, nitrogen or oxygen, $X^\ominus$ represents an anion and $n$ is 1 or 2, the process comprising the steps of
   a. imagewise exposing a photographic element comprising a support having thereon a light-sensitive layer comprising photosensitive silver halide,
   b. developing said photographic element to form a photographihc silver image in exposed regions,
   c. reacting the silver halide remaining in unexposed regions with an aqueous solution comprising said heterocyclammonium salt to form the complex in said regions, and
   d. removing said photographic silver image from exposed regions,
to leave said complex in unexposed regions.

8. An element comprising a support having thereon an image that is opaque to ultraviolet and blue light and is substantially transparent to wavelengths of light over about 500 nm., said image comprising a chemical complex of silver with a heterocyclammonium salt having the formula:

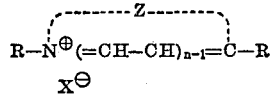

wherein R represents a hydrogen atom, a sulfoalkyl group, a carboxyalkyl group, an alkyl group, an aryl group substituted with an alkyl group, a halogen atom, an alkoxy, thioalkyl, or nitro group, $R_1$ represents a hydrogen atom, an alkyl group, or an alkyl group substituted with an alkoxy, thioalkyl, carboxyl, alkali metal carboxylate, sulfo, or nitro group, Z represents the nonmetallic atoms necessary to complete a 5 to 6 membered heterocyclic nucleus containing one or 2 heteroatoms of which the second heteroatom is sulfur, nitrogen or oxygen, $X^\ominus$ represents an anion and $n$ is 1 or 2.

9. An element as described in claim 8 wherein the support is a substantially transparent material.

10. An element comprising a support having thereon an image that is opaque to ultraviolet and blue light and is substantially transparent to wavelengths of visible light over about 500 nm., said image comprising a chemical complex of silver with a heterocyclammonium salt that is either N-(2,4-dinitrophenyl)pyridinium chloride, N-(2,4-dinitrophenyl)quinolinium bromide, 5-nitroquinolinium nitrate, 5,7-dinitroquinolinium nitrate, N-methylquinolium iodide, or N-methylquinaldinium methylsulfate.

References Cited
UNITED STATES PATENTS 2,066,582  1/1937  Sheppard et al. _____ 96—114.6
3,532,502  10/1970  Boyer et al. _____ 96—114.6

NORMAN G. TORCHIN, Primary Examiner

R. L. SCHILLING, Assistant Examiner

U.S. Cl. X.R.

96—44, 59, 60 R, 84 R, 84 U.V.